Oct. 26, 1965 E. F. PARROTT, JR 3,214,738

TRANSFORMER DIODE SHIFT MATRIX

Filed June 19, 1961 4 Sheets-Sheet 1

INVENTOR
EUGENE F. PARROTT JR.

ATTORNEY

Oct. 26, 1965 E. F. PARROTT, JR 3,214,738
TRANSFORMER DIODE SHIFT MATRIX
Filed June 19, 1961 4 Sheets-Sheet 2
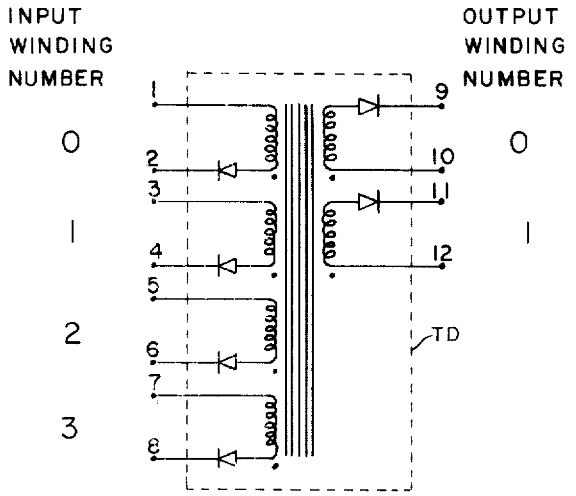
FIG. 2
TRANSFORMER-DIODE ASSEMBLY
FIG. 3
ENABLE CIRCUIT
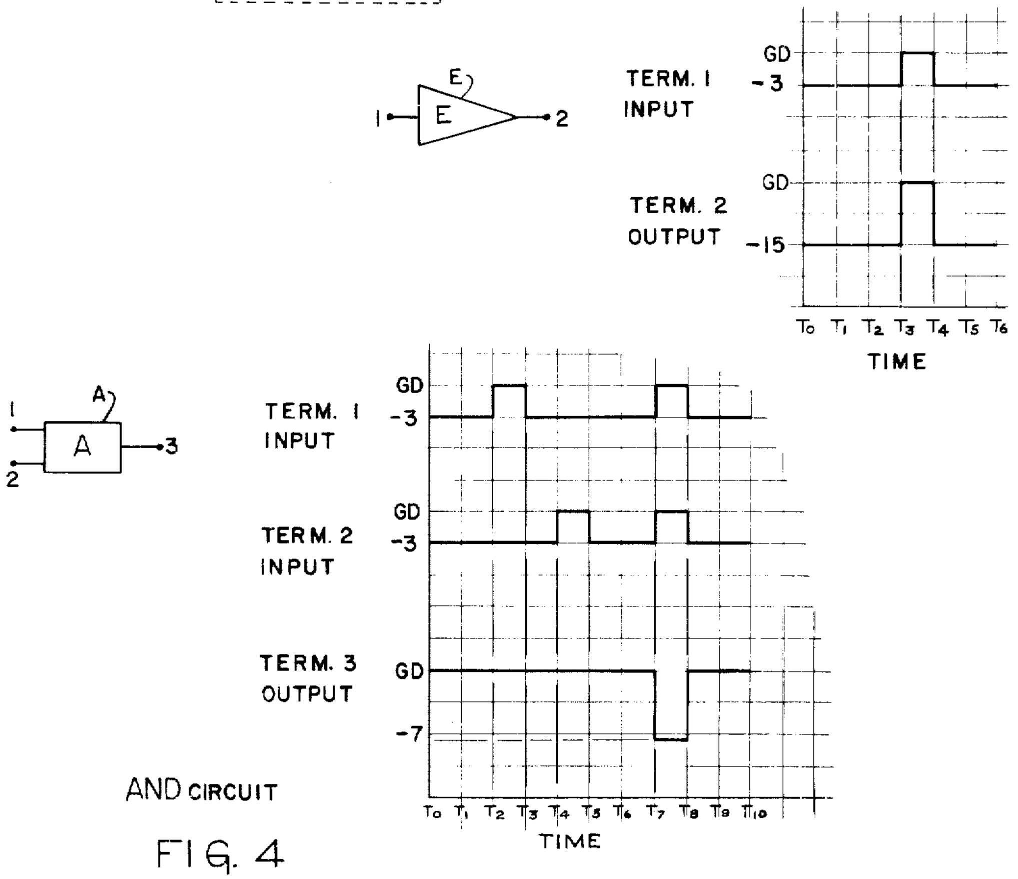
FIG. 3, FIG. 4
INVENTOR
EUGENE F. PARROTT JR.
Herbert F. Somermeyer
ATTORNEY Oct. 26, 1965 E. F. PARROTT, JR 3,214,738

TRANSFORMER DIODE SHIFT MATRIX

Filed June 19, 1961 4 Sheets-Sheet 3

INVENTOR
EUGENE F. PARROTT JR.

Herbert F. Sommermeyer

ATTORNEY

TRANSFORMER DIODE SHIFT MATRIX

Filed June 19, 1961 4 Sheets-Sheet 4

INVENTOR
EUGENE F. PARROTT JR.

ATTORNEY

United States Patent Office 3,214,738

Patented Oct. 26, 1965

3,214,738

TRANSFORMER DIODE SHIFT MATRIX

Eugene F. Parrott, Jr., Coon Rapids, Minn., assignor to Sperry Rand Corporation, New York, N.Y., a corporation of Delaware Filed June 19, 1961, Ser. No. 118,096
16 Claims. (Cl. 340—172.5)

This invention relates in general to computing apparatus and in particular to a shift matrix that may be utilized in an electronic data processing system employing a floating point arithmetic system.

In present day electronic data processing systems shifting components are utilized to perform an essential step in a multitude of arithmetic functions such as multiplication and division. Prior art shifting devices that have utilized transformers have applied the saturable transformer characteristic to provide paths of high or low impedance to signals applied to windings thereof. This invention, in contrast, applies the coupling transformer characteristic of non-saturable transformers.

An exemplary embodiment of this shift matrix is comprised of a plurality of transformers each having a plurality of input and output windings with each winding having a serially associated unilateral impedance device and first and second terminals. Signals representative of a first word which is representative of the shifting function to be performed are coupled to first terminals of each of the input and output windings. This first word grounds selected input and output windings through electronic circuitry and thereby creates paths of low impedance whose arrangement is representative of the shifting function. Signals representative of a second word are coupled to second terminals of the input windings which if coupled to input windings grounded by the action of the first word create varying magnetic fields about the associated transformers. These varying magnetic fields in each transformer couple all output windings of each transformer and each output winding which has been grounded by the action of the first word has a signal induced therein. These signals are present on the second terminals of the output windings and are representative of the second word which has been shifted in its transmission through the shift matrix as determined by the shift function.

A primary object of the present invention is to provide an apparatus for the parallel transmission of information through a shift matrix from an input register to an output register, the information being shifted a predetermined number of bit positions in the process of transmission as determined by a translated shift count register input to the shift matrix.

Another object of this invention is to provide an improved and simplified one pulse shift matrix utilizing ordinary circuit elements such as diodes and conventional pulse transformers.

Another object of this invention is to provide a shift matrix which through the use of ordinary transformer and diode elements and through a unique combination of inter-connections provides a one step parallel shift of a selectable predetermined number of bit positions.

A further object of this invention is to provide a shift matrix which utilizes fewer components with less power consumption and provides greater speeds than conventional signal shifting devices.

A still further object of this invention is to provide an apparatus whereby standard diodes and transformers are interconnected to form a shift matrix which selectively provides combinations of low impedance electrical paths between input and output registers of an associated electronic data processing system.

These and other more detailed and specific objectives will be disclosed in the course of the following specification, reference being had to the accompanying drawings, in which:

FIG. 2 is a symbolic representation of the transformer-diode assembly used in the illustrated embodiment of FIG. 1;

FIG. 3 is a symbolic representation of the enable circuit and its input/output signal relationships as use in the illustrated embodiments of FIG. 1;

FIG. 4 is a symbolic representation of the AND circuit and its input/output signal relationships as used in the illustrated embodiment of FIG. 1;

Figure 1:
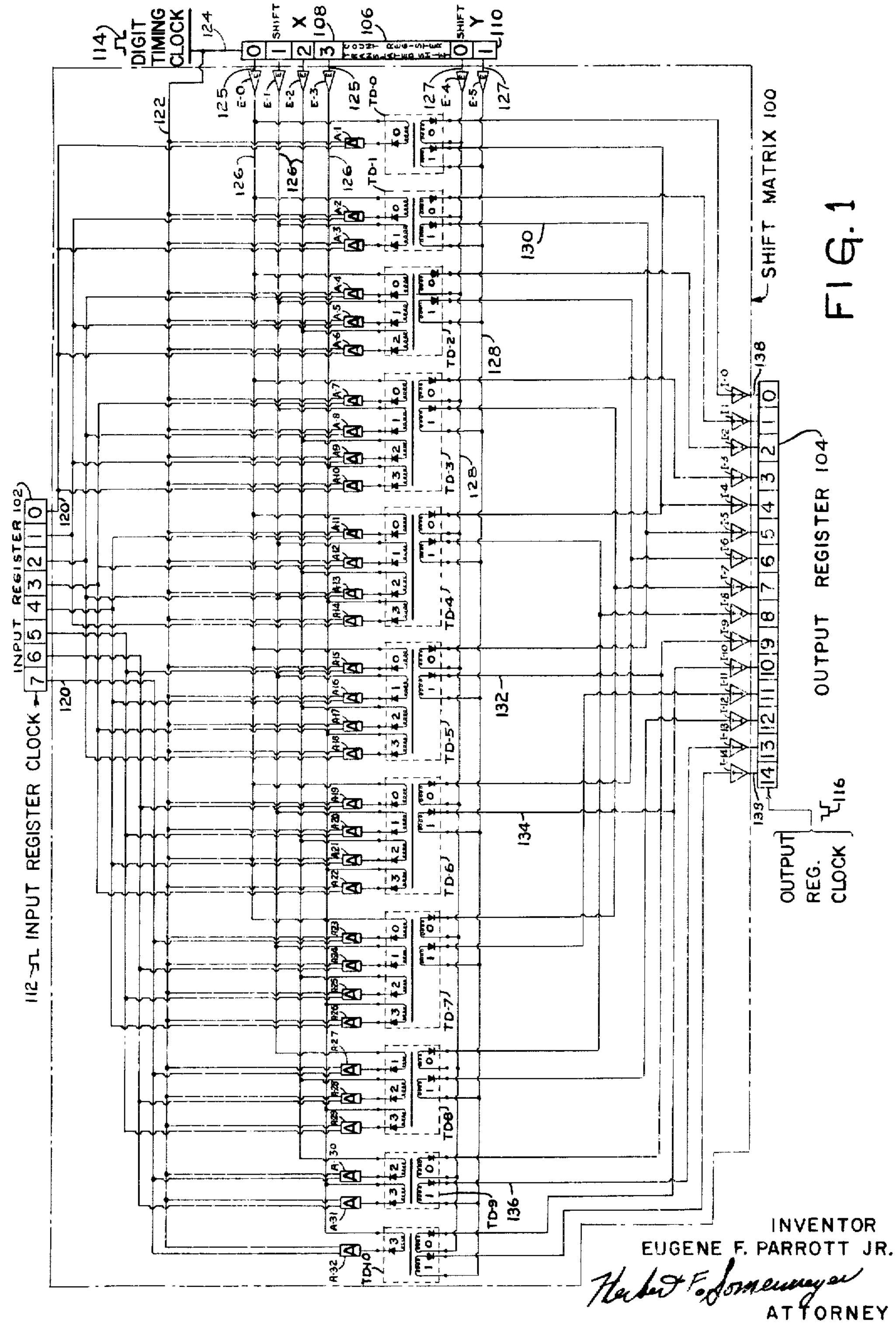
FIG. 1 is a schematic diagram of one embodiment of this invention and illustrates a shift matrix that will shift an eight bit word a maximum of 7 bit positions.

The illustrated embodiment of FIG. 1 is a schematic diagram of an exemplary embodiment of this invention which advantageously employs diodes and multi-winding linear pulse transformers to provide a reliable high speed, low power shift matrix. This embodiment has the capability of shifting an 8 bit word from a minimum of 0 bit positions to a maximum of 7 bit positions while transmitting such word from an input register into an output register of an associated electronic data processing system. The shift matrix 100 of FIG. 1 which essentially consists of the unique combination of transformer-diode assemblies TD–0 through TD–10 illustrates a typical wiring arrangement proposed to achieve a desired left-wise shift.

In this embodiment shift matrix 100 is coupled to an electronic data processing system, not shown, which contains input register 102, output register 104, translated shift count register 106, comprising portions Shift X 108 and Shift Y 110, and which provides an input register clock 112, a digit timing clock 114 and an output register clock 116. Input register 102 has 8 bit positions numbered 0 through 7 and output register 104 has 15 bit positions numbered 0 through 14 while translated shift count register 106 has 6 bit positions: 4 Shift X 108 bit positions numbered 0 through 3 and two Shift Y 110 bit positions numbered 0 and 1.

The illustrated embodiment of FIG. 1 is designed to operate in conjunction with an electronic data processing system utilizing a 1.50 megacycle 4 phase clocking system. Basically, information in binary form of 8 bits of length is placed in input register 102 and the translated shift count of 6 bits in length, 4 Shift X 108 bits and two Shift Y 110 bits is placed in translated shift count register 106. Next, input register clock 112 enables input register 102 releasing signals representative of the information stored therein upon AND circuits A–1 through A–32. Concurrently, digit timing clock 114 enables translated shift count register 106 releasing signals representative of the Shift X 108 portion of the translated shift count upon enable circuits E–0 through E–3 which are associated with the input windings of transformer-diode assemblies TD–0 through TD–10 and releasing signals representative of the Shift Y 110 portion of the translated shift count upon enable circuits E–4 and E–5 which are associated with the output windings of transformer-diode assemblies TD–0 through TD–10. Enable circuit E–0, E–1, E–2, or E–3 and enable circuit E–4 or E–5 which are coupled to a translated shift count register 106 Shift X 108 or Shift Y 110 bit position which contains a "1" ground the associated input and output windings. Simultaneously, digit timing clock 114 enables AND circuit A–1 through A–32. Only those input windings of transformer-diode assembly TD–0 through TD–10 which are grounded to enable circuit E–0, E–1, E–2 or E–3 and whose associated AND circuit has its AND condition fulfilled have a current signal pass therethrough generating a varying magnetic field which couples all windings of the particular transformer-diode assembly. Further, only those output windings of transformer-diode assembly TD–0 through TD–10 which are grounded through enable circuit E–4 or E–5 and which are also part of a transformer-diode assembly which has a varying magnetic field thereabout have signals induced therein which are coupled to inverter circuits I–0 through I–14. Concurrently, output register clock 116 enables output register 104 writing therein the signals representative of the information placed in input register 102 which has been shifted in its transmission through shift matrix 100 in accordance with the translated shift count placed in translated shift count register 106.

For better understanding of the operation of the illustrated embodiment of FIG. 1 the electrical elements thereof have been assigned logically relatable reference symbols. Inverter circuits I–0 through I–14 are associated with output register 104 bit positions 0 through 14 respectively. Enable circuits E–0 through E–3 are associated with translated shift count register 106 Shift X 108 bit positions 0 through 3 respectively. Enable circuits E–4 and E–5 are associated with translated shift count register 106 Shift Y 110 bit positions 0 and 1 respectively. Transformer-diode assemblies TD–0 through TD–10 have been numbered from right to left in the illustrated embodiment of FIG. 1 so as to present a more formal style so as to simplify discussions describing its operation. Lastly, AND circuits A–1 through A–32 have been numbered from right to left in the illustrated embodiment of FIG. 1 to simplify the reading and understanding thereof. Additionally, transformer-diode assembly input and output winding numbers have been maintained in their same relationship in the illustrated embodiment of FIG. 1 as in FIG. 2 except where unused windings are omitted for clarity.

Translated shift count register 106 illustrates an embodiment of this invention whereby a 6 bit word is utilized in the translated shift count register. In the illustrated translated shift count register 106 there are two portions designated the Shift X 108 portion and the Shift Y 110 portion. Shift X 108 contains, from top to bottom, bit positions 0, 1, 2 and 3 while Shift Y 110 contains, from top to bottom, bit position 0 and 1. A translated shift count placed in translated shift count register 106 determines the number of bit positions information contained in input register 102 will be shifted in its parallel transmission through shift matrix 100 into output register 104.

Shift X 108 bit positions 0 through 3 are unweighted, the translated shift count being a direct representation of the translated shift count bit position, i.e., Shift X 108 bit position 0 represents a shift 0 bits while Shift X 108 bit position 3 represents a shift of 3 bits. Shift Y 110 bit positions 0 and 1 are weighted, the translated shift count being a multiple of 4 of the Shift Y 110 bit positions, i.e, Shift Y 110 bit position 0 represents a shift of 0 bits while Shift Y 110 bit position 1 represents a shift of 4 bits. Thus for purposes of illustration assume translated shift count register 106 contains the translated shift count 0010–01: Shift X 108 word being 0010 and Shift Y 110 word being 01. Using the above evaluation this represents the equation:

$$\text{Shift} = \text{Shift X} + \text{Shift Y}$$

$$\text{Shift} = 0010 + 01$$

The decimal equivalent of this equation being:

$$\text{Shift} = (0\times0+0\times1+1\times2+0\times3)+(0\times0+1\times4)$$

$$\text{Shift} = (2)+(4)$$

$$\text{Shift} = 6$$

Thus, with this translated shift count stored in translated shift count register 106 the word stored in bit position 0 through 7 of input register 102 would in its transmission through shift matrix 100 be shifted 6 bit positions occupying output register 104 bit positions 6 through 13. It is inherent in the illustrated embodiment of FIG. 1 that only one bit position in each of Shift X 108 and Shift Y 110 contains a "1," all other bit positions must contain a "0."

FIG. 2 illustrates an embodiment of a transformer-diode assembly which may be used with the illustrated embodiment of FIG. 1. This assembly includes a conventional linear pulse transformer having six windings; four windings designated the input windings, and two windings designated the output windings.

The transformer-diode assembly to be utilized is determined by the shift count arithmetic system used and in all cases use the same number of input windings as the number of Shift X 108 bit positions and the same number of output windings as the number of Shift Y 110 bit positions. Thus, as in the illustrated embodiment of FIG. 1 translated shift count register 106 utilizes four Shift X 108 bit positions and two Shift Y 110 bit positions there are required four input windings and two output windings per transformer-diode assembly. Further, input windings 0 through 3 are associated with Shift X 108 bit positions 0 through 3, respectively, and output windings 0 and 1 are associated with Shift Y 110 bit positions 0 and 1, respectively.

It is apparent on reference to FIG. 1 that all windings of transformer-diode assemblies having four input windings and two output windings are not coupled to a bit position of input register 102 or translated shift count register 106. For example, inspection of FIG. 1 indicates that input windings 1, 2, and 3 of transformer-diode assembly TD–0, input windings 2 and 3 of transformer-diode assembly TD–1, input winding 3 of transformer-diode assembly TD–2, input winding 0 of transformer-diode assembly TD–8, input windings 0 and 1 of transformer-diode assembly TD–9, and input windings 0, 1 and 2 of transformer-diode assembly TD-10 are not coupled to a bit position of input register 102 or translated shift count register 106. Thus, if desirable, transformer-diode assemblies with only the necessary number of windings as used in the embodiment of FIG. 1 may be utilized instead of the standard transformer-diode assembly of FIG. 2. However, due to the economy of standardization and negligible difference in size, weight, and cost it is usually desirable that the standard transformer-diode assembly of FIG. 2 be used throughout the illustrated embodiment of FIG. 1, it being understood that windings not coupled to register bit positions and thus not utilized are omitted for clarity in FIG. 1.

In the illustrated embodiment of FIG. 1 the grounding of an odd number terminal of an input winding concurrent with the imposition of a negative voltage on the even numbered terminal of such input winding forward biases a diode associated with such input winding. The diodes associated with the input windings consequently are poled so as to pass a negative going signal impressed on the even numbered terminal with the odd numbered terminal grounded. Similarly in the illustrated embodiment of FIG. 1 the grounding of an even numbered terminal of an output winding concurrent with the flow of a current signal through an input winding which current signal creates a varying magnetic field coupling all windings throughout the transformer-diode assembly permits a positive going current signal to be induced in such grounded output windings. The diodes associated with the output windings consequently are poled so as to pass a positive going current signal out of the odd numbered terminal. Additionally, the number of turns of each output winding is substantially twice that of each input winding to provide voltage amplification.

It is aparent that the design of the transformer-diode assembly is predicated upon many parameters, signal functions of the associated electronic data processing system being only a few of the determining factors. The transformer-diode assembly disclosed in FIG. 2 is intended as an illustrative embodiment which provides the necessary functions required by the illustrated embodiment of FIG. 1

The transformer-diode assembly of FIG. 2 is of such design that each input winding has substantially the same coupling with each output winding. The wiring arrangement of the input windings to the Shift X 108 portion of translated shift count register 106 and to input register 102, and of the output windings to the Shift Y 110 portion of translated shift count register 106 and to output register 104 as regards a specific winding number is not critical, but is given for purposes of illustrating the typical wiring arrangement of FIG. 1. Thus any input winding of transformer-diode assembly TD–3 could be coupled to Shift X 108 bit position 0 instead of input winding 0, for example, input windings 1, 2 or 3, the only requirement being that the correct combination of Shift X 108 bit position and input register 102 bit position be maintained.

Figure 5:
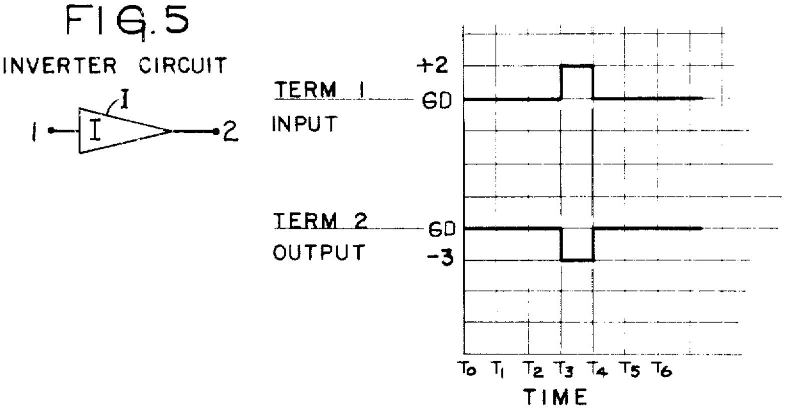
FIG. 5 is a symbolic representation of the inverter circuit and its input/output signal relationships as used in the illustrated embodiment of FIG. 1.

For purposes of better understanding the operation involved, FIGS. 3 through 5 have been presented as typical embodiments of logical electronic elements that may be utilized with shift matrix 100 illustrated in FIG. 1.

FIG. 3 illutsrates a conventional enable circuit which may be used with the illustrated embodiment of FIG. 1 and which, upon proper input from translated shift count register 106, will transmit a ground signal to all input windings of all transformer-diode assemblies coupled thereto. The normal, or off, input to this circuit representing a "0" in the corresponding bit position of translated shift count register 106 is a −3 volt signal with a normal output of −15 volts. The signal from translated shift count register 106 which is the input to the enable circuit representing a "1" in the corresponding bit position is a ground signal for the grounding in of terminal 1. Grounding of terminal 1 results in a ground signal at terminal 2. This, in effect, completes an essential initial step of the shift matrix cycle by grounding those transformer-diode assembly input windings and output windings which are coupled to the particular translated shift count register 106 bit positions which contain a "1." This then completes the circuit of the particular input winding with the varying magnetic field induced by the current signal therethrough coupled to all windings of the transformer-diode assembly. Only that output winding associated with the Shift Y 110 bit position containing a "1" is activated by the grounding of the even numbered output terminal. The odd numbered terminals of the output windings are coupled to inverter circuits which, when provided a +2 volts input signal, provide a −3 volts output signal with sufficient drive to write a "1" in output register 104 when output register clock 116 enables the write-in operation.

FIG. 4 presents a conventional AND circuit which may be used with the illustrated embodiment of FIG. 1. This circuit consists of a positive AND and an inverter stage. Under normal, or off, conditions inputs to terminals 1 or 2 are of the magnitude of −3 volts which result in an output voltage at terminal 3 of ground. When the digit timing clock 114 ground signal is impressed upon input terminal 1 concurently with the imposition at terminal 2 of an input register 102 output ground signal from a bit position containing a "1," such input signals consisting of grounding terminals 1 and 2, the output signal at terminal 3 is −7 volts FIG. 5 is an illustration of a conventional inverter circuit which may be used with the illustrated embodiment of FIG. 1. Under normal, or off, conditions the input to terminal 1 is a ground signal which results in a ground signal output at terminal 2. When an input signal of +2 volts is impressed upon input terminal 1, −3 volts is obtained at output terminal 2.

For purposes of providing a detailed explanation of the operation of shift matrix 100 of FIG. 1, certain bit voltage representations associated with the storing of a "0" or "1" in the below named registers shall be assumed, and are given in Table A below.

*Table A*

| Function | Bit Voltage Representation | |
|---|---|---|
| | "0" | "1" |
| Shift Matrix input from Input Register 102 | −3v | GD |
| Shift Matrix Input from Translated Shift Count Register 106 | −3v | GD |
| Shift Matrix Output to Output Register 104 | GD | −3v |

Clocking signals perform an enabling or AND function with the element clocked. This enabling function permits the bit voltage representation stored in the element clocked to be released and impressed upon conductors or any signal data means coupled thereto, or permits the bit voltage representation impressed upon the conductors or any signal data means which are coupled to the element clocked to be transmitted therein. Thus, clocking of translated shift count register 106 and input register 102 permits the bit voltage representations or signals representative of the words stored therein to be impressed upon conductors 120, 125, and 127 which couple shift matrix 100 to the respective bit positions of said registers. Likewise, clocking of output register 104 permits the signals representative of the shifted word which is impressed upon conductors 138 which couple shift matrix 100 to the respective bit positions of output register 104 to be written into output register 104.

Reference to Table A indicates that upon the clocking of input register 102 and translated shift count register 106 the presence of a "0" stored in a register bit position will impress a signal of —3 volts upon the conductors associated with that particular bit position while the presence of a "1" will impress a ground signal upon the conductors associated with that particular bit position. Further, Table A indicates that upon the clocking of output register 104 the presence of a signal of —3 volts upon the conductor associated with a particular bit position of output register 104 will write a "1" in that bit position while the presence of a ground signal upon the conductor associated with a particular bit position of output register 104 will write a "0" in that bit position. As will be shown in more detail in subsequent discussion of the operation of shift matrix 100, the shifting operation as performed by the illustrated embodiment of FIG. 1 writes only "1's", "0's" being written by the non-writing of "1's," it being understood that prior to initiation of the shift matrix cycle output register 104 is cleared, by means not shown, to register all "0's."

Table B illustrates the wiring arrangement of translated shift count register 106, input register 102, output register 104, and transformer-diode assemblies TD–0 through TD–10 of the illustrated embodiment of FIG. 1. Vertical columns are designated in the left-hand portion by the numerals 0, 1, 2, and 3, and in the right-hand portion by the numerals 0 and 1. These numerals in the left-hand portion correspond to translated shift count register 106 Shift X 108 bit positions and transformer-diode assembly input winding numbers; all transformer-diode assembly input windings of the same number are coupled in common to the translated shift count register 106 Shift X 108 bit position of the same number. Thus, all transformer-diode assembly input winding odd numbered terminals of input windings 0 that are utilized are coupled in common to the translated shift count register 106 Shift X 108 bit position 0. In a similar manner these numerals in the right-hand portion correspond to translated shift count register 106 Shift Y 110 bit position and transformer-diode assembly output winding members; all transformer-diode assembly output winding even numbered terminals of output windings of the same number are coupled in common to the translated shift count register 106 Shift Y 110 bit position of the same number. Thus, all transformer-diode assembly output winding even numbered terminals of output windings 0 are coupled in common to the translated shift count register 106 Shift Y 110 bit position 0.

Horizontal lines are designated by the transformer-diode assembly number. Numbers in the vertical columns of the left-hand portion correspond to input register 102 bit positions, while those in the vertical columns of the right-hand portion correspond to output register 104 bit positions. Input register 102 and output register 104 bit positions at the intersection of a transformer-diode assembly number line and the Shift X 108 and Shift Y 110 bit position columns in the left-hand and right-hand portions of Table B designate the input register 102 and output register 104 bit positions that are coupled to the corresponding input winding even numbered terminal and output winding odd numbered terminal, respectively.

An illustration of the use of Table B and the wiring arrangement of the components of FIG. 1 is as follows:

Input register 102 bit position 0 is coupled to the following transformer-diode assembly input winding even numbered terminals: winding 0 of transformer-diode assembly TD–0, winding 1 of transformer-diode assembly TD–1, winding 2 of transformer-diode assembly TD–2, and winding 3 of transformer-diode assembly TD–3.

Similarly, it is apparent that input register 102 bit position 7 is coupled to the following transformer-diode assembly input winding even numbered terminals: winding

*Table B*

| | Shift X Bit Position And Transformer-Diode Assembly Input Winding Number | | | | Transformer-Diode Assembly Number | Shift Y Bit Position And Transformer-Diode Assembly Output Winding Number | | |
|---|---|---|---|---|---|---|---|---|
| | 0 | 1 | 2 | 3 | | 0 | 1 | |
| Input Register Bit Position | 0 | | | | TD-0 | 0 | 4 | Output Register Bit Position |
| | 1 | 0 | | | TD-1 | 1 | 5 | |
| | 2 | 1 | 0 | | TD-2 | 2 | 6 | |
| | 3 | 2 | 1 | 0 | TD-3 | 3 | 7 | |
| | 4 | 3 | 2 | 1 | TD-4 | 4 | 8 | |
| | 5 | 4 | 3 | 2 | TD-5 | 5 | 9 | |
| | 6 | 5 | 4 | 3 | TD-6 | 6 | 10 | |
| | 7 | 6 | 5 | 4 | TD-7 | 7 | 11 | |
| | | 7 | 6 | 5 | TD-8 | 8 | 12 | |
| | | | 7 | 6 | TD-9 | 9 | 13 | |
| | | | | 7 | TD-10 | 10 | 14 | |

0 of transformer-diode assembly TD–7, winding 1 of transformer-diode assembly TD–8, winding 2 of transformer-diode assembly TD–9, and winding 3 of transformer-diode assembly TD–10. Thus it is apparent by an inspection of Table B and FIG. 1 that the wiring arrangement of input register 102, output register 104, translated shift count register 106, and transformer-diode assemblies TD–0 through TD–10 of shift matrix 100 may be determined from Table B.

Similarly it is apparent that transformer-diode assembly TD–0 has its input winding 0 odd numbered terminal coupled to Shift X 108 bit position 0, and its even numbered terminal coupled to input register 102 bit position 0. Its output winding 0 even numbered terminal is coupled to Shift Y 110 bit position 0, and its odd numbered terminal is coupled to output register 104 bit position 0. Additionally, its output winding 1, even numbered terminal, is coupled to Shift Y 110 bit position 1, and its odd numbered terminal is coupled to output register 104 bit position 4.

In a similar manner it can be seen by inspection of Table B and FIG. 1 that transformer-diode assembly TD–4 has its input winding 0 odd numbered terminal coupled to Shift X 108 bit position 0, and its even numbered terminal coupled to input register 102 bit position 4. Its input winding 1 odd numbered terminal is coupled to Shift X 108 bit position 1 and its even numbered terminal is coupled to input register 102 bit position 3. Similarly, input winding 2 odd numbered terminal is coupled to Shift X 108 bit position 2 and its even numbered terminal is coupled to input register 102 bit position 2. Lastly, input winding 3 odd numbered terminal is coupled to Shift X 108 bit position 3 and the even numbered terminal is coupled to input register 102 bit position 1. Output winding 0 even numbered terminal is coupled to Shift Y 110 bit position 0, and the odd numbered terminal is coupled to output register 104 bit position 4. Lastly, output winding 1 even numbered terminal is coupled to Shift Y 110 bit position 1, and the even numbered terminal is coupled to output register 104 bit position 8.

Once the generation of Table B is understood, one of ordinary skill in the art may design a shift matrix utilizing the principles of this invention.

For purposes of illustration, assume the requirement of designing a shift matrix capable of shifting information of 36 bits in length, i.e., input register bit positions 0 through 35, a maximum of 36 bit positions into an output register of 72 bit positions in length, i.e., output register bit positions 0 through 71. Assume further that the translated shift count register shall present the translated shift count in octal form with Shift X bit positions 0 through 7 and Shift Y bit positions 0 through 4. As before, Shift X bit positions 0 through 7 are unweighted, the translated shift count being a direct representation of the translated shift count bit position, i.e., Shift X bit position 0 represents a shift of zero bit positions while Shift X bit position 7 represents a shift of 7 bit positions. Shift Y bit positions 0 through 4 are, as before, weighted, the translated shift count being a multiple of 8 of the Shift Y bit position, i.e., Shift Y bit position 0 represents a shift of 0 bit positions while Shift Y bit position 3 represents a shift of 24 bit positions. Thus, for purposes of illustration, assume the translated shift count register contains the translated shift count 00000100–00010; Shift X word being 00000100 and Shift Y word being 00010. Using the technique of above, the evaluation of this shift count represents the equation:

$$\text{Shift} = \text{Shift X} + \text{Shift Y}$$
$$\text{Shift} = 00000100 + 00010$$

The decimal equivalent of this equation is:

$$\text{Shift} = (0\times0+0\times1+0\times2+0\times3+0\times4+1\times5+0\times6+0\times7) + (0\times0+0\times4+0\times8+0\times16+1\times24+0\times32)$$
$$\text{Shift} = (5) + (24)$$
$$\text{Shift} = 29$$

Thus, with this translated shift count stored in the translated shift count register, the information stored in bit positions 0 through 35 of the input register would in its transmission through the shift matrix be shifted 29 bit positions occupying output register bit positions 29 through 64.

Table C illustrates the wiring arrangement of the translated shift count register, input register, output register, and transformer-diode assemblies necessary to fabricate the above assumed shift matrix capable of shifting a 36 bit word a maximum of 36 bit positions into an output register of 72 bit positions. The transformer-diode assembly used in this embodiment would, as explained hereinbefore, require 8 input windings numbered 0 through 7 and 5 output windings numbered 0 through 4.

Figure 7:
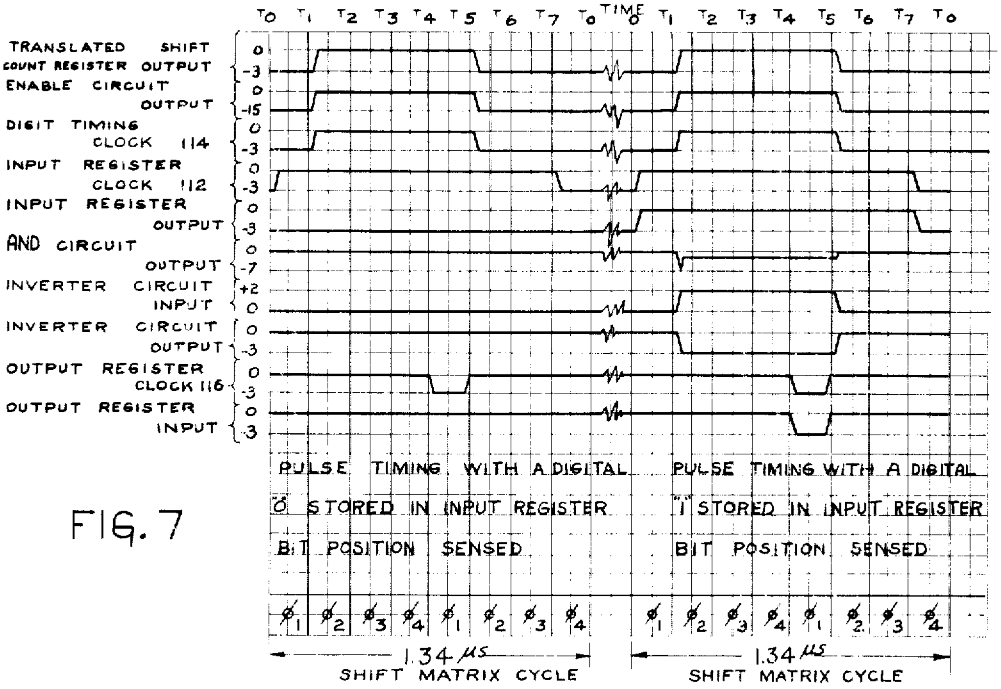
FIG. 7 is an illustration of the pulse iming of the circuits of the illustrated embodiment of FIG. 1 as exemplified by the circuitry of FIG. 6.
Figure 6:
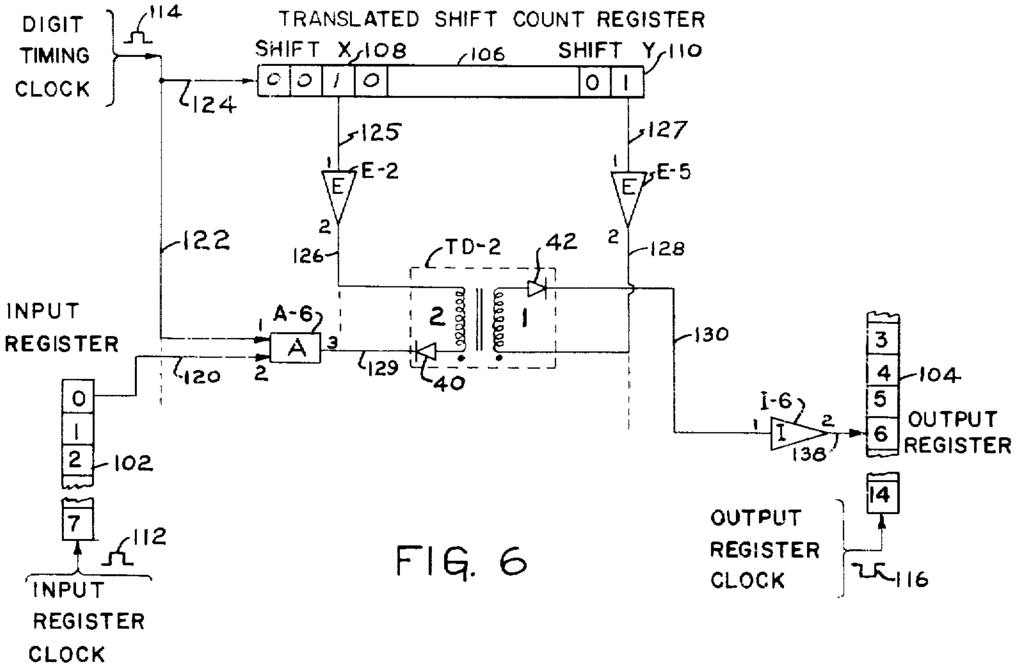
FIG. 6 is a diagrammatic illustration of the exemplary circuitry associated with the transmission of a bit from bit position 0 of an input register to bit position 6 of an output register.

FIG. 6 is presented to illustrate the manner which the electrical components of FIGS. 2 through 5 shift the contents of bit position 0 of input register 102 into bit position 6 of output register 104. FIG. 6 shows translated shift count register 106 to contain the translated shift count 0010–01 indicating a shift of 6 bit positions. With the above translated shift count stored in translated shift count register 106, correspondence with FIG. 1 indicates that all utilized transformer-diode assembly input windings 2 and output windings 1 will be grounded through enable circuits E–2 and E–5 respectively when digit timing clock 114 enables translated shift count register 106. Further, for better illustrating the function of the circuit of FIG. 6, FIG. 7 is presented.

As discussed hereinbefore the illustrated embodiment of FIG. 1 is designed to operate in conjunction with an electronic data processing system utilizing a 4 phase clocking system. FIG. 7 illustrates the shift matric cycle which occupies two 4 phase clocking cycles or a total of 8 phases. For purposes of aiding in the understanding of FIG. 7 the 8 phases making up the shift matrix cycle have been assigned time periods beginning with time $T_0$ at the left and proceeding to the right through time $T_7$. This timing procedure is utilized in describing the timing sequence of the shift matrix cycle when either a "0" or a "1" is stored in input register 102.

Under the conditions when selected bit position 0 of input register 102 contains a "0," the following circuit functions are performed. Input register 102 bit position 0 containing a "0" impresses a −3 volts upon terminal 2 of AND circuit A–6 through conductor 120 when enabled by input register clock 112 at time $T_0$. At time $T_1$ digit timing clock 114 impresses a ground signal upon terminal 1 of AND circuit A–6 through conductor 122. As described in FIG. 4, AND circuit A–6 is a positive AND circuit which requires the simultaneous imposition of two ground signals on input terminals 1 and 2 to provide a negative voltage signal at terminal 3.

Under the conditions just described the AND condition is not met and thus the output at terminal 3 is a ground signal. A ground signal from terminal 3 of AND circuit A–6 is impressed by conductor 129 upon the cathode of diode 40. Simultaneously, digit timing clock 114 enables translated shift count register 106 through conductor 124 and Shift X 108 bit position 2, containing a "1," enables enable circuit E–2 through conductor 125 by impressing a ground signal on its terminal 1. This results in a ground signal on terminal 2 of enable circuit E–2 which is passed by conductor 126 through input winding 2 of transformer-diode assembly TD–2 to the anode of diode 40. Thus, diode 40 has on its cathode a ground voltage and on its anode a ground voltage which, not forward biasing diode 40, causes diode 40 to pass no signal therethrough with the resulting effect that no signal is generated in the other windings of transformer-diode assembly TD–2. This, in effect, is the same as not writing a "1" or equivalent to the writing of a "0". A "0" having been initially placed in bit position 6 of output register 104, this is equivalent then to the "0" of input register 102 bit

*Table C*

Input Register Bit Position (left side label); Output Register Bit Position (right side label)

| Shift X Bit Position and Transformer-Diode Assembly Input Winding Number | | | | | | | | Transformer-Diode Assembly Number | Shift Y Bit Position and Transformer-Diode Assembly Output Winding Num-Number | | | | |
|---|---|---|---|---|---|---|---|---|---|---|---|---|---|
| 0 | 1 | 2 | 3 | 4 | 5 | 6 | 7 | | 0 | 1 | 2 | 3 | 4 |
| 0 | | | | | | | | TD-0 | 0 | 8 | 16 | 24 | 32 |
| 1 | 0 | | | | | | | TD-1 | 1 | 9 | 17 | 25 | 33 |
| 2 | 1 | 0 | | | | | | TD-2 | 2 | 10 | 18 | 26 | 34 |
| 3 | 2 | 1 | 0 | | | | | TD-3 | 3 | 11 | 19 | 27 | 35 |
| 4 | 3 | 2 | 1 | 0 | | | | TD-4 | 4 | 12 | 20 | 28 | 36 |
| 5 | 4 | 3 | 2 | 1 | 0 | | | TD-5 | 5 | 13 | 21 | 29 | 37 |
| 6 | 5 | 4 | 3 | 2 | 1 | 0 | | TD-6 | 6 | 14 | 22 | 30 | 38 |
| 7 | 6 | 5 | 4 | 3 | 2 | 1 | 0 | TD-7 | 7 | 15 | 23 | 31 | 39 |
| 8 | 7 | 6 | 5 | 4 | 3 | 2 | 1 | TD-8 | 8 | 16 | 24 | 32 | 40 |
| 9 | 8 | 7 | 6 | 5 | 4 | 3 | 2 | TD-9 | 9 | 17 | 25 | 33 | 41 |
| 10 | 9 | 8 | 7 | 6 | 5 | 4 | 3 | TD-10 | 10 | 18 | 26 | 34 | 42 |
| 11 | 10 | 9 | 8 | 7 | 6 | 5 | 4 | TD-11 | 11 | 19 | 27 | 35 | 43 |
| 12 | 11 | 10 | 9 | 8 | 7 | 6 | 5 | TD-12 | 12 | 20 | 28 | 36 | 44 |
| 13 | 12 | 11 | 10 | 9 | 8 | 7 | 6 | TD-13 | 13 | 21 | 29 | 37 | 45 |
| 14 | 13 | 12 | 11 | 10 | 9 | 8 | 7 | TD-14 | 14 | 22 | 30 | 38 | 46 |
| 15 | 14 | 13 | 12 | 11 | 10 | 9 | 8 | TD-15 | 15 | 23 | 31 | 39 | 47 |
| 16 | 15 | 14 | 13 | 12 | 11 | 10 | 9 | TD-16 | 16 | 24 | 32 | 40 | 48 |
| 17 | 16 | 15 | 14 | 13 | 12 | 11 | 10 | TD-17 | 17 | 25 | 33 | 41 | 49 |
| 18 | 17 | 16 | 15 | 14 | 13 | 12 | 11 | TD-18 | 18 | 26 | 34 | 42 | 50 |
| 19 | 18 | 17 | 16 | 15 | 14 | 13 | 12 | TD-19 | 19 | 27 | 35 | 43 | 51 |
| 20 | 19 | 18 | 17 | 16 | 15 | 14 | 13 | TD-20 | 20 | 28 | 36 | 44 | 52 |
| 21 | 20 | 19 | 18 | 17 | 16 | 15 | 14 | TD-21 | 21 | 29 | 37 | 45 | 53 |
| 22 | 21 | 20 | 19 | 18 | 17 | 16 | 15 | TD-22 | 22 | 30 | 38 | 46 | 54 |
| 23 | 22 | 21 | 20 | 19 | 18 | 17 | 16 | TD-23 | 23 | 31 | 39 | 47 | 55 |
| 24 | 23 | 22 | 21 | 20 | 19 | 18 | 17 | TD-24 | 24 | 32 | 40 | 48 | 56 |
| 25 | 24 | 23 | 22 | 21 | 20 | 19 | 18 | TD-25 | 25 | 33 | 41 | 49 | 57 |
| 26 | 25 | 24 | 23 | 22 | 21 | 20 | 19 | TD-26 | 26 | 34 | 42 | 50 | 58 |
| 27 | 26 | 25 | 24 | 23 | 22 | 21 | 20 | TD-27 | 27 | 35 | 43 | 51 | 59 |
| 28 | 27 | 26 | 25 | 24 | 23 | 22 | 21 | TD-28 | 28 | 36 | 44 | 52 | 60 |
| 29 | 28 | 27 | 26 | 25 | 24 | 23 | 22 | TD-29 | 29 | 37 | 45 | 53 | 61 |
| 30 | 29 | 28 | 27 | 26 | 25 | 24 | 23 | TD-30 | 30 | 38 | 46 | 54 | 62 |
| 31 | 30 | 29 | 28 | 27 | 26 | 25 | 24 | TD-31 | 31 | 39 | 47 | 55 | 63 |
| 32 | 31 | 30 | 29 | 28 | 27 | 26 | 25 | TD-32 | 32 | 40 | 48 | 56 | 64 |
| 33 | 32 | 31 | 30 | 29 | 28 | 27 | 26 | TD-33 | 33 | 41 | 49 | 57 | 65 |
| 34 | 33 | 32 | 31 | 30 | 29 | 28 | 27 | TD-34 | 34 | 42 | 50 | 58 | 66 |
| 35 | 34 | 33 | 32 | 31 | 30 | 29 | 28 | TD-35 | 35 | 43 | 51 | 59 | 67 |
| | 35 | 34 | 33 | 32 | 31 | 30 | 29 | TD-36 | 36 | 44 | 52 | 60 | 68 |
| | | 35 | 34 | 33 | 32 | 31 | 30 | TD-37 | 37 | 45 | 53 | 61 | 69 |
| | | | 35 | 34 | 33 | 32 | 31 | TD-35 | 38 | 46 | 54 | 62 | 70 |
| | | | | 35 | 34 | 33 | 32 | TD-39 | 39 | 47 | 55 | 63 | 71 |
| | | | | | 35 | 34 | 33 | TD-40 | 40 | 48 | 56 | 64 | |
| | | | | | | 35 | 34 | TD-41 | 41 | 49 | 57 | 65 | |
| | | | | | | | 35 | TD-42 | 42 | 50 | 58 | 66 | |

position 0 having been shifted to output register 104 bit position 6.

With a "1" in bit position 0 of input register 102, the following circuit functions occur. A "1" in input register 102 bit position 0 causes a ground signal to be passed by conductor 120 to terminal 2 of AND circuit A–6 when enabled by input register clock 112 at time $T_0$. At time $T_1$ digit timing clock 114 impresses a ground signal upon terminal 1 of AND circuit A–6 through conductor 122. Thus, under these conditions, ground signals are impressed concurrently upon terminals 1 and 2 of AND circuit A–6, and in accordance with FIG. 4, causes a negative voltage signal to be provided at terminal 3. This negative voltage signal is impressed by conductor 129 upon the cathode of diode 4. Simultaneously, digit timing clock 114 enables translated shift count register 106 through conductor 124. Shift X 108 bit position 2 containing a "1" enables enable circuit E–2 through conductor 125 by impressing a ground signal on terminal 1 thereof which results in a ground signal at output terminal 2 of enable circuit E–2. This ground signal is then passed through conductor 126 through input winding 2 of transformer-diode assembly TD–2 to the anode of diode 40. Thus, the condition exists where the anode of diode 40 is at ground potential and the cathode of diode 40 is at a negative voltage level. This forward biasing of diode 40 permits the passage of a forward current therethrough. This current signal flowing through input winding 2 of transformer-diode assembly TD–2 creates a varying magnetic field coupling all windings thereof, including output winding 1.

Simultaneously, enable circuit E–5 associated with Shift Y 110 bit position 1 is enabled by digit timing clock 114. This, as in the Shift X 108 operation, provides a ground signal at terminal 1 of enable circuit E–5 through conductor 127 which provides a ground signal at terminal 2 of enable circuit E–5. Thus, the circuit including enable circuit E–5, conductor 128, output windings 1 of transformer-diode assembly TD–2, diode 42 and conductor 130 is completed to terminal 1 of inverter circuit I–6. Output winding 1 is wound with such sense in relation to input winding 2 as to induce therein a positive voltage signal of approximately +2.5 volts at the anode of diode 42. Inverter circuit I–6, as described in FIG. 5, is an inverter amplifier, whose normal output with an input of ground potential is ground potential. With the resulting signal generated in output winding 1, a +2 volts is impressed upon terminal 1 of inverter circuit I–6 through conductor 130 which results in an output signal at terminal 2 of inverter circuit I–6 of −3 volts, which is coupled to bit position 6 of output register 104 through conductor 138. At time $T_4$ and concurrent with the imposition of the −3 volts at bit position 6 of output register 104, output register clock 116 enables output register 104 and permits the bit voltage representations impressed upon the bit position inputs to be registered in output register 104 which, with a −3 volt signal impressed upon bit position 6, writes a "1" in output register 104 bit position 6. Thus it is seen by inspection of FIG. 1, FIG. 6 and FIG. 7 that the contents of input register 102 bit position 0 have been shifted to output register 104 bit position 6 in accordance with the translated shift count in translated shift count register 106.

Having now described the operation of the component parts of shift matrix 100 a discussion of the operation of the illustrated embodiment of FIG. 1 will be presented. For purposes of this discussion it will be assumed that input register 102 contains the word 10011001 and that translated shift count register 106 contains the translated shift count 0010–01 designating a left shift of 6 bit positions. As stated hereinbefore, output register 104 is initially cleared by means now shown to contain all "0's" or the word 000000000000000. Upon completion of the transmission of the word contained in input register 102 through shift matrix 100 and into output register 104, output register 104 will contain the word

010011001000000

Initially, at time $T_0$ (see FIG. 7) input register clock 112 enables input register 102 releasing its bit voltage representations (see Table A) upon conductors 120 which couple input register 102 bit positions to the associated transformer-diode assemblies. Clocking of input register 102 grounds all terminals 1 of the AND circuits associated with the input register 102 bit positions which contain a "1." With the illustrated embodiment of FIG. 1 and the word contained in input register 102 previously assumed, the following AND circuits have a ground signal impressed upon their terminal 2: A–1, A–3, A–6, A–7, A–10, A–11, A–12, A–16, A–17, A–21, A–22, A–23, A–26, A–27, A–30, and A–32. All other AND circuits have a negative signal impressed upon their terminal 2. Next, at time $T_1$, digit timing clock 114, concurrent with the imposition of input register clock 112 upon input register 102 as shown in FIG. 7, impresses a ground signal on terminal 1 of all AND circuits through conductor 122. Consequently, all AND circuits previously furnished a ground signal on their terminals 2 now meet the AND condition. All AND circuits whose AND condition has been met impress a negative signal upon the cathode of the diodes associated with the transformer-diode assembly input winding coupled to the corresponding AND circuits. Simultaneously, digit timing clock 114 enables translated shift count register 106 through conductor 124. The odd numbered terminals of all input windings associated with a Shift X 108 bit position containing a "1" are grounded, and in the embodiment of FIG. 1 with the translated shift count stored in translated shift count register 106 previously assumed, all utilized input windings 2 have their odd numbered terminals grounded through a common coupling to terminal 2 of enable circuit E–2. All other input winding odd numbered terminals have a negative voltage impressed thereon through coupling to terminal 2 of enable circuit E–0, E–1 and E–3. Consequently, only those input windings whose associated AND circuits have had their AND conditions met and as a result impress a negative voltage upon the cathode of the associated diodes and whose odd numbered terminals have been grounded, which impress a ground signal upon the anode of the associated diodes through the corresponding input windings present a condition whereby said diodes are forward biased permitting a current signal to flow through said input winding. Thus, it is apparent that only transformer-diode assemblies TD–2, TD–5, TD–6 and TD–9 which have had their input winding AND function met as described above present a varying magnetic field coupling all the output windings thereof.

As stated previously, digit timing clock 114 has enabled translated shift count register 106 at time $T_1$ releasing its bit voltage representations upon the conductors associated with Shift Y 110. The even numbered terminals of all output windings associated with a Shift Y 110 bit position containing "1" are grounded thereby. In the embodiment of FIG. 1 with the translated shift count stored in translated shift count register 106 previously assumed all output windings 1, having their even numbered terminals coupled to Shift Y 110 bit position 1, are grounded through a common coupling to terminal 2 of enable circuit E–5. All other output windings, i.e., output windings 0, are not grounded, but have a negative voltage signal impressed upon the anodes of the associated diodes which reverse biases such diodes and presents an equivalent open circuit to the varying magnetic field coupling such output windings. Additionally, as will be more fully described with the discussion of FIG. 8, the OR function of a transformer-diode assembly is met only by those transformer-diode assemblies which have an input winding passing a current signal therethrough. Consequently, only the AND function of the output windings of transformer-diode assemblies TD–2, TD–5, TD–6 and TD–9 are fulfilled. All other transformer-diode assembly output windings 1 have no signal induced therein. Inspection of FIG. 1 will show that output winding 1 of transformer-diode assembly TD–2 is coupled to bit position 6 of output register 104 through conductor 130 and inverter circuit I–6, that output winding 1 of transformer-diode assembly TD–5 is coupled to bit position 9 of output register 104 through conductor 132 and inverter circuit I–9, that output winding 1 of transformer-diode assembly TD–6 is coupled to bit position 10 of output register 104 through conductor 134 and inverter circuit I–10, and that output winding 1 of transformer-diode assembly TD–9 is coupled to bit position 13 of output register 104 through conductor 136 and inverter circuit I–13. A −3 volts is impressed by the appropriate conductors 138 from terminal 2 of inverter circuit I–6, I–9, I–10 and I–13 upon the associated output register 104 bit positions. Now output register clock 116, at time $T_4$ of the shift matrix cycle, is impressed upon output register 104 permitting the bit voltage representations impressed upon bit positions 6, 9, 10 and 13 through conductors 138 to be written therein. As discussed previously in FIG. 6, a ground signal emanating from an inverter circuit and impressed upon a bit position of the output register is equivalent to the writing of a "0" while a −3 volts signal impressed upon a bit position is equivalent to the writing of a "1." Consequently, output register 104 bit positions 6, 9, 10 and 13 are the only bit positions into which a "1" is written; all other bit positions remaining in their previous state, containing "0's." Thus, it is seen that the word contained in output register 104 is 010011001000000. As stated previously, the word contained in input register 102 has been shifted left 6 bit positions while it was transmitted through shift matrix 100 formed by transformer-diode assemblies TD–0 through TD–10.

Figure 8:
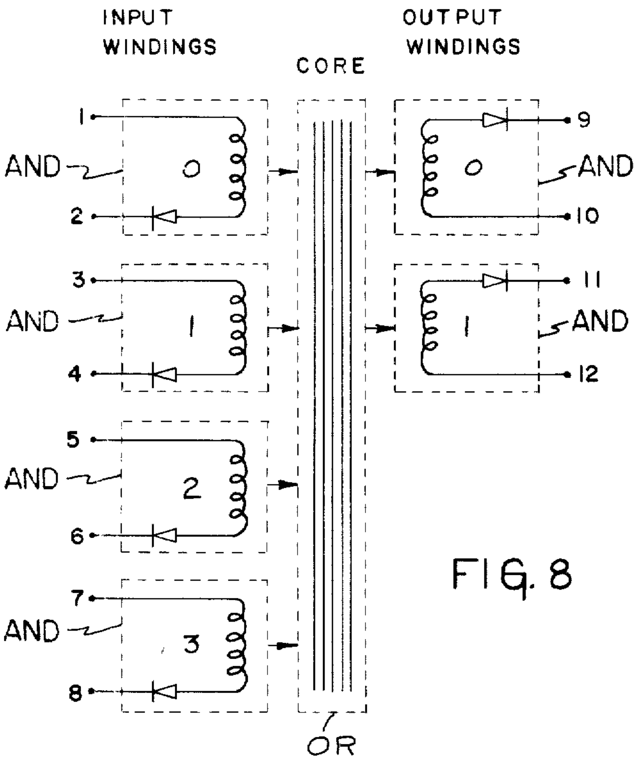
FIG. 8 is a symbolic representation of the transformer-diode assembly of FIG. 2 as an AND/OR/AND logic gate.

Having now described in detail the operation of the circuitry associated with the transformer-diode assembly, a detailed discussion of the operation of the transformer-diode assembly as a logical element and as illustrated in FIG. 8 will be given. As described hereinbefore, each input winding odd numbered terminal is coupled to a Shift X 108 bit position, which bit position if containing a "1" grounds said terminal through an enable circuit. A concurrent negative signal emanating from an AND circuit and impressed upon the even numbered terminal of the input winding whose odd numbered terminal is grounded forward biases the diode associated with such winding and causes a current signal to pass therethrough. Thus, each input winding is in effect and AND circuit requiring the concurrence of two conditions: grounding the odd numbered terminal, and impressing a negative signal on the even numbered terminal.

The transformer core and the mutual inductance of each winding will all other windings on the core provide an OR function between the input windings and the output windings. As the mutual inductance of every input winding with every output winding is substantially the same, activation of an input winding will have the same effect upon any output winding as would the activation of any other input winding. Thus, the transformer-diode assembly core and the mutual inductance of all windings thereon provide an OR function between the input windings and the output windings.

As described hereinbefore, each output winding even numbered terminal is coupled to a Shift Y 110 bit position which bit position, if containing a "1," grounds said terminal through an enable circuit. A concurrent current signal flowing through any input winding induces a voltage signal in the output winding whose even numbered terminal is grounded, which signal forward biases the diode associated with the grounded output winding. Forward biasing of the associated diode permits a current signal to flow out of the odd numbered terminal of said grounded output winding. Thus, each output winding is in effect an AND circuit requiring the concurrence of two conditions: grounding the even numbered terminal, and a magnetic field variation in the associated transformer-diode assembly core which couples said grounded output winding.

Thus it is apparent that the transformer-diode assembly of FIG. 2 functions as an AND/OR/AND logic gate in the embodiment of FIG. 1.

It is apparent that this invention as exemplified by the illustrated embodiment of FIG. 1 and utilizing the transformer-diode assembly of FIG. 2 may have many embodiments. An additional embodiment of this invention utilizing the transformer-diode assembly of FIG. 2 may be an end-around shift matrix as exemplified by Table D. In previous discussions of this invention relative to the use of Tables B and C, this invention was applied to the use of a shift matrix, that application being a left-wise shift matrix. However, it is apparent that by an inversion of the wiring arrangement of the conductors associated with input register 102, translated shift count register 106, output register 104, and transformer-diode assemblies TD–0 through TD–10 a right-wise shift may be accomplished. Likewise, a modification of Table B will illustrate a utilization of the subject invention as an end-around shift matrix as exemplified by the wiring arrangement of Table D. In the embodiment described by Table D, the number of transformer-diode assemblies utilized is reduced to a total of 8. Also this embodiment envisions an input register and an output register of 8 bit positions, 0 through 7. Comparison of Table D to Table B will show the similarity of the two arrangements. Initially, the transformer-diode assembly number is limited to numbers TD–0 through TD–7. Additionally, the input windings of transformer-diode assembly numbers TD–0,

*Table D*

| | Shift X Bit Position And Transformer-Diode Assembly Input Winding Number | | | | Transformer-Diode Assembly Number | Shift Y Bit Position And Transformer-Diode Assembly Output Winding Number | | |
|---|---|---|---|---|---|---|---|---|
| | 0 | 1 | 2 | 3 | | 0 | 1 | |
| Input Register Bit Position | 0 | 7 | 6 | 5 | TD-0 | 0 | 4 | Output Register Bit Position |
| | 1 | 0 | 7 | 6 | TD-1 | 1 | 5 | |
| | 2 | 1 | 0 | 7 | TD-2 | 2 | 6 | |
| | 3 | 2 | 1 | 0 | TD-3 | 3 | 7 | |
| | 4 | 3 | 2 | 1 | TD-4 | 4 | 0 | |
| | 5 | 4 | 3 | 2 | TD-5 | 5 | 1 | |
| | 6 | 5 | 4 | 3 | TD-6 | 6 | 2 | |
| | 7 | 6 | 5 | 4 | TD-7 | 7 | 3 | |

TD–1, and TD–2 not utilized in the illustrated embodiment of FIG. 1 are now utilized to provide the end-around shift. Transformer-diode assembly input winding connections previously associated with transformer-diode assemblies TD–8, TD–9 and TD–10 are brought up and coupled to the previously unused input windings of transformer-diode assemblies TD–0, TD–1 and TD–2. Additionally, conductors coupled to output register bit positions above bit position 7, i.e., bit positions 8 through 14 having been eliminated, are now coupled back to transformer-diode assemblies TD–4, TD–5, TD–6 and TD–7.

An illustration of the use of Table D and the resulting wiring arrangement of the above components is as follows:

Input register 102 bit position 0 is coupled to the following transformer-diode assembly input winding even numbered terminals: winding 0 of transformer TD–0, winding 1 of transformer TD–1, winding 2 of transformer TD–2, and winding 3 of transformer TD–3.

Input register 102 bit position 1 is coupled to the following transformer-diode assembly input winding even numbered terminals: winding 0 of transformer TD–1, winding 1 of transformer TD–2, winding 2 of transformer TD–3, and winding 3 of transformer TD–4.

Similarly, by inspection of Table D it is apparent that input register 102 bit position 7 is coupled to the following transformer-diode assembly input winding even numbered terminals; winding 0 of transformer TD–7, winding 1 of transformer TD–0, winding 2 of transformer TD–1, and winding 3 of transformer TD–2.

As noted in Table D, transformer-diode assembly TD–0 has its input winding 0 odd numbered terminal coupled to Shift X 108 bit position 0, and its even numbered terminal coupled to the input register 102 bit position 0. Its input winding 1 odd numbered terminal is coupled to Shift X 108 bit position 1, and its even numbered terminal is coupled to the input register 102 bit position 7. Its input winding 2 odd numbered terminal is coupled to Shift X 108 bit position 2 and its even numbered terminal is coupled to input register 102 bit position 6. Lastly, its input winding 3 odd numbered terminal is coupled to Shift X 108 bit position 3 and its even numbered terminal is coupled to input register 102 bit position 5. Its output winding 0 even numbered terminal is coupled to Shift Y 110 bit position 0 and its odd numbered terminal is coupled to output register 104 bit position 0. Additionally, its output winding 1 even numbered terminal is coupled to Shift Y 110 bit position 1 and its odd numbered terminal is coupled to output register 104 bit position 4.

In a similar manner it can be seen by inspection of Table D that transformer-diode assembly TD–4 has its input winding 0 odd numbered terminal coupled to Shift X 108 bit position 0 and its even numbered terminal coupled to input register 102 bit position 4. Its input winding 1 odd numbered terminal is coupled to Shift X 108 bit position 1 and its even numbered terminal is coupled to input register 102 bit position 3. Similarly, input winding 2 odd numbered terminal is coupled to Shift X 108 bit position 2, and the even numbered terminal is coupled to input register 102 bit position 2. Lastly, input winding 3 odd numbered terminal is coupled to Shift X 108 bit position 3, and the odd numbered terminal is coupled to input register 102 bit position 1. Output winding 0 even numbered terminal is coupled to Shift Y 110 bit position 0, and the odd numbered terminal is coupled to output register 104 bit position 4. Lastly, output winding 1 even numbered terminal is coupled to Shift Y 110 bit position 1 and the even numbered terminal is coupled to output register 104 bit position 0.

As with the discussion of Table B and Table C, once the generation of Table D is understood one of ordinary skill in the art may design an end-around shift matrix utilizing the principles of this invention.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A digit shifting network comprising: a plurality of nonsaturable transformer means, each of said transformer means having separate input winding means and a plurality of separate output winding means, each of said winding means including a separate unilateral impedance means; means providing multibit first digital data signals; means parallelly coupling each separate of said first digital data signals to a predetermined plurality of said input winding means; means providing multibit second digital data signals; means parallelly coupling each separate one of said second digital data signals to a predetermined plurality of said input winding means and said output winding means for providing unique low impedance electrical paths between no more than one combination of one input winding means and one output winding means of each of said transformer means; third digital data signals provided at said output winding means representative of said first digital data signals shifted in accordance with the pattern of unique low impedance electrical paths determined by said second digital data signals.

2. A shift matrix comprising: a plurality of nonsaturable transformer means, each of said transformer means including input winding means and output winding means, each of said winding means having first and second opposite end terminals, and each of said input winding means and output winding means including a serially associated unilateral impedance means; a plurality of input conductors each parallelly coupled to said first terminals of selected ones of said input winding means; a plurality of output conductors each parallelly, coupled to said first terminals of selected ones of said output winding means; means providing and coupling selected ones of a first discrete combination of potentials to said input conductors and said output conductors; switching means including said pluralities of transformer means for providing selectable combinations of low impedance electrical paths between said input conductors and said output conductors; a second discrete combination of potentials generated in said output conductors and representative of said first discrete combination of potentials processed in accordance with said switching means.

3. A digit shifting circuit for shifting a word consisting of a plurality of binary digits, or bits, from one positional relationship to another, each bit represented by at least two unique signals comprising: a pluarity of nonsaturable transformer means, each of said transformer means having input winding means and output winding means, each of said winding means having first and second terminals and a serially associated unilateral impedance means; means for holding a first word; first circuit means parallelly coupling first digital data signals representative of said first word to first terminals of predetermined ones of said input winding means; means for holding a second word; second circuit means conducting second digital data signals representative of said second word from first terminals of predetermined ones of said output winding means; means for holding a third word; shift control means coupled to said second terminals of predetermined ones of said input winding means and said output winding means for selectively conditioning said input winding means and said output winding means under control of third digital data signals representative of said third word that define the process by which said first digital data signals have been processed to become said second digital data signals.

4. A shift matrix for the one step parallel shifting from one poistioned relationship to another of a word consisting of a plurality of bits, each bit represented by at least two voltage levels comprising: a plurality of nonsaturable transformer means, each of said transformer means having separate winding means of a first and second class with each of said winding means having first and second terminals; first register means holding a multibit first word; separately coupling each bit of said first word parallelly to first terminals of predetermined ones of said first class of winding means; second register means holding a multibit second word comprising at least two parts, said second word representative of the number of bit positions said first word is to be shifted during its transmission through said shift matrix; means separately coupling each bit of said first part of said second word to second terminals of predetermined ones of said first class of winding means; means coupling predtermined bits of said second part of said second word to second terminals of predetermined ones of said second class of winding means; means for holding a third word, said third word comprising said first word shifted the number of bit positions as determined by said second word; predetermined bits of said third word presented, at each of the first terminals of the said second class of winding means that are coupled by said second word.

5. The apparatus of claim wherein a separate unilateral impedance device is serially associated with each of said windings of said first and second class.

6. The apparatus of claim 5 wherein said unilateral impedance devices are poled so as to pass a positive signal out of said first terminals of said windings of said first and second class.

7. A shift matrix for the one step parallel shifting from one positional relationship to another of a word consisting of a plurality of bits, each bit represented by at least two voltage levels comprising: a plurality of nonsaturable transformer means, each transformer means having first input and second output classes of winding means with each winding means having first and second opposite end terminals; first signal means representative of a first multibit word for coupling each separate bit of said first word parallelly to the first terminals of predetermined winding means of said first class; second signal means representative of a first part of a second multibit word, said second word representative of the number of bit positions said first word is to be shifted, for coupling each separate bit of said first part of said second word parallelly to the second terminals of predetermined winding means of said first class; third signal means representative of a second part of said second word available at the first terminals of predetermined winding means of said second class and to the second terminals of predetermined winding means of said second class; fourth signal means representative of a third word, said third word comprising said first word shifted the number of bit positions as determined by said second word.

8. A shift matrix for the one step parallel shifting from one positional relationship to another of a word consisting of a plurality of bits, each bit represented by at least two voltage levels comprising: an input register; a shift count register; an output register; a plurality of nonsaturating transformer means; each transformer means having first input and second output classes of winding means with each winding means having first and second terminals; each predetermined bit position of said input register parallelly coupled to predetermined first terminals of said first class of winding means; each predetermined bit position of said shift count register parallelly coupled to predetermined second terminals of said first class of winding means, other predetermined bit positions of said shift count register parallelly coupled to predetermined second terminals of said second class of winding means; each predetermined bit position of said output register coupled to predetermined first terminals of said second class of winding means; a first clock signal source for enabling said shift count register bit positions; a second clock signal source for enabling said input register bit positions; a third clock signal source for enabling said output register bit positions; and said input register, shift count register, output register, and transformer means interconnected whereby the word in the shift count register determines the number of bit positions the word in the input register is shifted during its transmission through said transformer means into said output register during the concurrent enabling of said registers by said corresponding clock signals.

9. An electronic data processing system comprising: an input register; a shift count register; an output register; a plurality of nonsaturable transformer means; each of said registers having a plurality of bit positions; each of said transformer means having first input and second output classes of winding means with each of said winding means having first and second terminals; each bit position of said input register parallelly coupled to first terminals of predetermined ones of said first class of winding means; certain predetermined bit positioins of said shift count register parallelly coupled to second terminals of predetermined ones of said first class of winding means, other predetermined bit positions of said shift count register parallelly coupled to second terminals of predetermined ones of said second class of winding means; each bit position of said output register coupled to first terminals of at least one of said second class of winding means; said input register, shift count register, output register, and transformer means interconnected whereby data signals in said shift count register determine the number of bit positions the data signals in said input register are shifted during their one step parallel transmission through said transformer means into said output register.

10. The apparatus of claim 9 wherein a separate unilateral impedance device is serially associated with each of said windings of said first and second class.

11. The apparatus of claim 10 wherein said unilateral impedance devices are poled so as to pass a positive signal out of said first terminals of said windings of said first and second class.

12. A shift matrix for the one step parallel shifting from one positional relationship to another of a word consisting of a plurality of bits or characters, each character represented by at least two signal voltage levels comprising: a plurality of nonsaturable transformer means; each of said transformer means including at least one input winding means and at least one output winding means, each of said winding means having first and second terminals and including impedance means responsive to a voltage applied thereacross; a source of first digital data signals defining multi-bit characters to be processed; means coupling each predetermined character of said first digital data signals to separate predetermined first terminals of said input winding means; a source of second digital data signals defining multi-bit characters which define a first part of the process to be performed on said first digital data signals; means coupling each predetermined character of said second digital data signals to separate predetermined second terminals of said input winding means; the passage of a signal through said impedance means of said input winding means determined by the concurrence of predetermined signal levels of said first and second digital data signals across said impedance means of said input winding means; a source of third digital data signals defining multi-bit characters which define a second part of the process to be performed on said first digital data signals; means coupling each predetermined character of said third digital data signals to separate predetermined second terminals of said output winding means; the passage of a signal through said impedance means of said output winding means determined by the concurrence of predetermined signal levels across said impedance means of said output winding means of said third digital data signal and a signal determined by a varying magnetic field generated by the passage of a signal through an input winding means of the associated transformer means; fourth digital data signals generated in said output winding means and presented at said output winding means first terminals and being representative of said first digital data signals processed in accordance with said second and third digital data signals.

13. An electronic data processing system for the shifting from one positional relationship to another of a word consisting of a plurality of bits, each bit represented by at least two voltage levels comprising: an input register; an output register; a shift count register; each of said registers having a plurality of bit positions; a plurality of nonsaturable transformer means, each of said transformer means having input winding means and output winding means, each of said winding means having first and second terminals and a serially associated asymmetrical impedance means poled so as to pass a positive signal out of said first terminals of said input winding means and said output winding means; at least one set of input winding means comprised of predetermined ones of said input winding means of certain predetermined transformer means; at least one set of output winding means comprised of predetermined ones of said output winding means of certain predetermined transformer means; first circuit means coupling each bit position of said input register to a first terminal of one of said input winding means of certain of said sets of input winding means; second circuit means coupling each bit position of said output register to a first terminal of one of said output winding means of certain of said sets of output winding means; said plurality of bit positions of said shift count register comprising at least first and second parts; third circuit means coupling each bit position of said first part of said plurality of bit positions of said shift count register to a separate one of certain of said sets of input winding means; fourth circuit means coupling each bit position of said second part of said plurality of bit positions of said shift count register to a separate one of certain of said sets of output winding means; a first word stored in said input register and associated bit-by-bit with said bit positions of said input register; a second word stored in said shift count register comprised of at least first and second parts with said first part associated bit by bit with said first part of said bit positions of said shift count register and said second part associated bit by bit with said second part of said bit positions of said shift register; said first part of said second word selectively conditioning one of said sets of input winding means and said second part of said second word selectively conditioning one of said sets of output winding means whereby said first word is processed in its transmission through said plurality of transformer means in accordance with the selective conditioning of said sets of input winding means and said sets of output winding means so as to generate a third word; means providing a first clocking signal enabling said input register which permits the bit voltage representations of said first word to be impressed upon said first circuit means; means providing a second clocking signal enabling said shift count register which permits the bit voltage representations of said second word to be impressed upon said third circuit means and said fourth circuit means; means providing a third clocking signal enabling said output register which permits the bit voltage representations of said third word to be impressed upon said second circuit means; said first, second, and third clocking signals occurring concurrently causing said third word to be stored in said output register and associated bit by bit with said bit positions of said output register.

14. An electronic data processing system for the shifting from one positional relationship to another of a word consisting of a plurality of bits, each bit represented by at least two voltage levels comprising: an input register; an output register; a shift count register; each of said registers having a plurality of bit positions; a plurality of nonsaturable transformer means, each of said transformer means having input winding means and output winding means, each of said winding means having first and second terminals and a serially associated asymmetrical impedance means poled so as to pass a positive signal out of said first terminals of said input winding means and said output winding means; at least one set of input winding means comprised of only one of said input winding means of certain predetermined transformer means; at least one set of output winding means comprised of only one of said output winding means of certain predetermined transformer means; a plurality of enable circuts each having an input terminal and an output terminal; means coupling all second terminals of said output winding means of a set of output winding means in common to a separate enable circuit output terminal; means coupling all second terminals of said input winding means of a set of input winding means in common to a separate enable circuit output terminal; first circuit means coupling each of said ontput register bit positions to no more than one of said first terminals of said output winding means of each set of output winding means; said plurality of bit positions of said shift count register comprising at least first and second parts; a first word stored in said input register and associated bit by bit with said bit positions of said input register; a second word stored in said shift count register consisting of at least first and second parts with said first part associated bit by bit with said first part of said bit positions of said shift count register and said second part associated bit by bit with said second part of said bit positions of said shift count register; said first part of said second word selectively conditioning one of said sets of input winding means and said second part of said second word selectively conditioning one of said sets of output winding means whereby said first word is processed in its transmission through said plurality of transformer means in accordance with the selective conditioning of said sets of input winding means and said sets of output winding means so as to generate a third word; second circuit means coupling each of said input winding means first terminals to predetermined bit positions of said input register; third circuit means coupling said input terminals of each of said enable circuits which are associated with said sets of input winding means to a separate one of said bit positions of said first part of said shift count register; fourth circuit means coupling said input terminals of each of said enable circuits which are associated with said sets of output winding means to a separate one of said bit positions of said second part of said shift count register; a first clocking signal enabling said input register which permits the bit voltage representations of said first word to be impressed upon said first circuit means; means coupling said first clocking signal to said input register; a second clocking signal enabling said shift count register which permits the bit voltage representations of said second word to be impressed upon said third circuit means and said fourth circuit means; means coupling said second clocking signal to said shift count register; a third clocking signal enabling said output register which permits the bit voltage representations of said third word which are impressed upon said first circuit means to be stored in said output register; means coupling said third clocking signal to said output register; said first, second and third clocking signals occurring concurrently; said third word stored in said output register and associated bit by bit with said bit positions of said output register.

15. An electronic data processing system for the shifting from one positional relationship to another of a word consisting of a plurality of bits, each bit represented by at least two voltage levels comprising: an input register; an output register; a shift count register; each of said registers having a plurality of bit positions; a plurality of nonsaturable transformer means, each of said transformer means having input winding means and output winding means, each of said winding means having first and second terminals and a serially associated asymmetrical impedance means poled so as to pass a positive signal out of said first terminals of said input winding means and said output winding means; at least one set of input winding means comprised of only one of said input winding means of certain predetermined transformer means; at least one set of output winding means comprised of only one of said output winding means of certain predetermined transformer means; a plurality of enable circuits each having an input terminal and an output terminal; a plurality of inverter circuits each having an input terminal and an output terminal; means coupling all second terminals of said output winding means of a set of output winding means in common to a separate enable circuit output terminal; means coupling all second terminals of said input winding means of a set of input winding means in common to a separate enable circuit output terminal; means coupling said input terminal of each of said inverter circuits to no more than one of said first terminals of said output winding means of each set of output winding means; said plurality of bit positions of said shift count register comprising at least first and second parts; a first word stored in said input register and associated bit by bit with said bit positions of said input register; a second word stored in said shift count register consisting of at least first and second parts with said first part associated bit by bit with said first part of said bit positions of said shift count register and said second part associated bit by bit with said second part of said bit positions of said shift count register; said first part of said second word selectively conditioning one of said sets of input winding means and said second part of said second word selectively conditioning one of said sets of output winding means whereby said first word is processed in its transmission through said plurality of transformer means in accordance with the selective conditioning of said sets of input winding means and said sets of output winding means so as to generate a third word; first circuit means coupling each of said input winding means first terminals to predetermined bit positions of said input register; second circuit means coupling each of said inverter circuit output terminals to one of said bit positions of said output register; third circuit means coupling said input terminals of each of said enable circuits which are associated with said sets of input winding means to a separate one of said bit positions of said first part of said shift count register; fourth circuit means coupling said input terminals of each of said enable circuits which are associated with said sets of output winding means to a separate one of said bit positions of said second part of said shift count register; a first clocking signal enabling said input register which permits the bit voltage representations of said first word to be impressed upon said first circuit means; means coupling said first clocking signal to said input register; a second clocking signal enabling said shift count register which permits the bit voltage representations of said second word to be impressed upon said third circuit means and said fourth circuit means; means coupling said second clocking signal to said shift count register; a third clocking signal enabling said output register which permits the bit voltage representations of said third word which are impressed upon said second circuit means to be stored in said output register means coupling said third clocking signal to said output register; said first, second, and third clocking signals occurring concurrently; said third word stored in said output register and associated bit by bit with said bit positions of said output register.

16. An electronic data processing system for the shifting from one positional relationship to another of a word consisting of a plurality of bits, each bit represented by at least two voltage levels comprising: an input register; an output register; a shift count register; each of said registers having a plurality of bit positions; a plurality of nonsaturable transformer means, each of said transformer means having input winding means and output winding means, each of said winding means having first and second terminals and a serially associated asymmetrical impedance means poled so as to pass a positive signal out of said first terminals of said input winding means and said output winding means; at least one set of input winding means comprised of a predetermined one of said input winding means of certain predetermined transformer means; at least one set of output winding means comprised of a predetermined one of said output winding means of certain predetermined transformer means; a plurality of AND circuits each having first and second input terminals and an output terminal; a plurality of enable circuits each having an input terminal and an output terminal; a plurality of inverter circuits each having an input terminal and an output terminal; means coupling all second terminals of said output winding means of a set of output winding means in common to a separate enable circuit output terminal; means coupling all second terminals of said input winding means of a set of input winding means in common to a separate enable circuit output terminal; means coupling said output terminal of a separate one of said AND circuits to said first terminal of each of said input winding means; means coupling said input terminal of each of said inverter circuits to no more than one of said first terminals of said output winding means of each set of output winding means; said plurality of bit positions of said shift count register comprising at least first and second parts; a first word stored in said input register and associated bit by bit with said bit positions of said input register; a second word stored in said shift count register consisting of at least first and second parts with said first part associated bit by bit with said first part of said bit positions of said shift count register and said second part associated bit by bit with said second part of said bit positions of said shift count register; said first part of said second word selectively conditioning one of said sets of input winding means and said second part of said second word selectively conditioning one of said sets of output winding means whereby said first word is processed in its transmission through said plurality of transformer means in accordance with the selective conditioning of said sets of input winding means and said sets of output winding means so as to generate a third word; first circuit means coupling each of said AND circuit input terminals to predetermined bit positions of said input register; second circuit means coupling each of said inverter circuit output terminals to one of said bit positions of said output register third circuit means coupling said input terminals of each of said enable circuits which are associated with said sets of input winding means to a separate one of said bit positions of said first part of said shift count register; fourth circuit means coupling said input terminals of each of said enable circuits which are associated with said sets of output winding means to a separate one of said bit positions of said second part of said shift count register; a first clocking signal enabling said input register which permits the bit voltage representations of said first word to be impressed upon said first circuit means; means coupling said first clocking signal to said input register; a second clocking signal enabling said shift count register which permits the bit voltage representations of said second word to be impressed upon said third circuit means and said fourth circuit means; means coupling said second clocking signal to said shift count register; means coupling said second clocking signal to each of said AND circuit second input terminals; a third clocking signal enabling said output register which permits the bit voltage representations of said third word which are impressed upon said second circuit means to be stored in said output register; means coupling said third clocking signal to said output register; said first, second, and third clocking signals occurring concurrently; said third word stored in said output register and associated bit by bit with said bit positions of said output register.

References Cited by the Examiner

UNITED STATES PATENTS

| | | | |
|---|---|---|---|
| 2,657,272 | 10/53 | Dimond | 340—347 |
| 2,931,014 | 3/60 | Buchholz | 340—166 |
| 3,076,181 | 1/63 | Newhouse et al. | 340—174 |
| 3,140,472 | 7/64 | Adams et al. | 307—88 X |

ROBERT C. BAILEY, *Primary Examiner.*

MALCOLM A. MORRISON, *Examiner.*

UNITED STATES PATENT OFFICE

CERTIFICATE OF CORRECTION

Patent No. 3,214,738 October 26, 1965

Eugene F. Parrott, Jr.

It is hereby certified that error appears in the above numbered patent requiring correction and that the said Letters Patent should read as corrected below.

Column 2, line 35, for "iming" read -- timing --; column 5, line 39, for "aparent" read -- apparent --; column 18, line 11, after "separate" insert -- one --; line 49, for "pluarity" read -- plurality --; line 71, for "poistioned" read -- positioned --; column 19, line 3, before" separately" insert -- means --; line 12, for "predtermined" read -- predetermined --; line 21, after "claim" insert -- 4 --; lines 45 to 47, strike out "available at the first terminals of predetermined winding means of said second class and" and insert instead -- for coupling each separate bit of said second part of said second word parallelly --; line 49, after "means" insert -- available at the first terminals of predetermined winding means of said second class and --; column 20, line 18, for "positioins" read -- positions --; column 22, line 5, for "termials" read -- terminals --; line 13, for "circuts" read -- circuits --; line 21, for "ontput" read -- output --.

Signed and sealed this 29th day of November 1966.

(SEAL)
Attest:

ERNEST W. SWIDER
Attesting Officer

EDWARD J. BRENNER
Commissioner of Patents